United States Patent [19]

Dale

[11] Patent Number: 4,600,590

[45] Date of Patent: Jul. 15, 1986

[54] METHOD FOR INCREASING THE REACTIVITY AND DIGESTIBILITY OF CELLULOSE WITH AMMONIA

[75] Inventor: Bruce E. Dale, Fort Collins, Colo.

[73] Assignee: Colorado State University Research Foundation, Fort Collins, Colo.

[21] Appl. No.: 311,168

[22] Filed: Oct. 14, 1981

[51] Int. Cl.$^4$ .............................................. A23K 1/22
[52] U.S. Cl. ..................................... 426/69; 426/635; 426/807
[58] Field of Search ................ 426/69, 319, 442, 447, 426/449, 807, 635; 162/22, 21, 63, 64, 81, 83, 54, 97

[56] References Cited

U.S. PATENT DOCUMENTS

| | | | |
|---|---|---|---|
| 2,580,491 | 1/1952 | Ward et al. | 260/212 |
| 3,282,313 | 11/1966 | Schuerch | 144/327 |
| 3,667,961 | 6/1972 | Algeo | 426/447 X |
| 3,707,436 | 12/1972 | O'Connor | 162/22 X |
| 3,939,286 | 2/1976 | Jelks | 127/37 |
| 4,136,207 | 1/1979 | Bender | 426/447 |
| 4,163,687 | 8/1979 | Mamers et al. | 162/22 |
| 4,235,707 | 11/1980 | Burke | 162/22 X |
| 4,356,196 | 10/1982 | Hultquist | 426/69 |

FOREIGN PATENT DOCUMENTS

| | | | |
|---|---|---|---|
| 487521 | 6/1976 | Australia | 162/22 |
| 2310459 | 9/1974 | Fed. Rep. of Germany | 162/54 |

OTHER PUBLICATIONS

Connor; Ammonia Explosion Pulping; Tappi/Mar. 1972, vol. 55, No. 3, pp. 353-358.

Webster's New Collegiate Dictionary; 1960, G. & C. Merriam Co., p. 28.

Barry, Peterson & King "X-Ray Studies of Reactions of Cellulose in Non Aqueous Systems," vol. 58 J. American Chemical Society, pp. 333-337, Feb. 1936.

Dale & Moreira, "A Freeze-Explosion Technique for Increasing Cellulose Hydrolysis," 4th Annual Symposium on Biotechnology in Energy Production and Conservation, May 11-14, 1982, Paper No. 4.

Millett, Baker & Sattes, "Physical and Chemical Pretreatments for Enhancing Cellulose Saccharification", Biotechnol. & Bioeng. Symp. No. 6, pp. 125-153 (1976).

Baker & Millet, "Wood and Wood-Based Residues in Animal Feeds", Cellulose Technology Research, ACS Symposium No. 10, pp. 75-87 (1975).

*Primary Examiner*—S. Leon Bashore
*Assistant Examiner*—K. M. Hastings
*Attorney, Agent, or Firm*—Burton, Dorr & Carson

[57] ABSTRACT

A method of treating cellulose-containing materials to increase chemical and biological reactivity of cellulose. The cellulose is contacted, in a pressure vessel, with a volatile liquid swelling agent having a vapor pressure greater than atmospheric at ambient temperatures, such as ammonia. The contact is maintained for a sufficient time to enable said agent to swell the cellulose fibers. The pressure is rapidly reduced to atmospheric, allowing said agent to boil and explode the cellulose fiber structure. The rapid pressure reduction also causes some freezing of the cellulose. The agent is separated from said cellulose and recovered for recycling.

6 Claims, 4 Drawing Figures

METHOD FOR INCREASING THE REACTIVITY AND DIGESTIBILITY OF CELLULOSE WITH AMMONIA

BACKGROUND OF THE INVENTION

1. Field of the Invention

The present invention relates to a method for increasing the chemical and biological reactivity of cellulose. More particularly the invention relates to a method for increasing the digestibility of cellulose-containing feedstuffs, such as alfalfa, hay, wheat straw, wood fibers, corn stover, and the like, by ruminant animals.

In addition, the invention relates to a method for increasing the extraction of components such as protein from plant materials.

2. Description of the Prior Art

Many techniques have been used to increase the chemical and biochemical reactivity of cellulose. A number of factors influence cellulose reactivity, including particle size and fiber surface area, lignin content, cellulose crystallinity, etc. The techniques referred to can be characterized as either physical or chemical in nature. The physical treatments include ball-milling to very small mesh sizes, two-roll milling and attrition milling. These physical treatments are effective in producing a highly reactive and accessible cellulose. However, the power requirements for size reduction are so large as to make such treatments very costly. Chemical treatments include strong bases such as sodium hydroxide, strong acids, and various other cellulose swelling and dissolving agents such as the transition metal complex cellulose solvents. These chemical methods are also effective in producing highly reactive, accessible cellulose materials. These chemical agents have the disadvantage that they are expensive and must be recovered for reuse. Furthermore, many of these chemicals are toxic or inhibiting to biological systems such as are found in an alcohol fermentation facility or in the digestive tract of ruminant animals such as cattle, sheep, etc. Therefore, the removal of the chemical agents from the treated cellulose-containing material must be very complete. This further increases the expense of such chemical treatments. Furthermore, most such chemical agents are removed by washing with water. This has two major disadvantages: First, the water dilutes the cellulose-swelling or dissolving agent so that this chemical agent no longer effectively swells cellulose. Such chemical agents must be concentrated for reuse; this generally involves considerable capital equipment and operating expense. Second, water is known to promote the recrystallization of decrystallized cellulose. As cellulose recrystallizes, it becomes less and less reactive. Therefore, it is likely that the full effect of the decrystallizing or swelling agent is not obtained due to recrystallization caused by water. See Millet et al., "Pretreatments to Enhance Chemical, Enzymatic, and Microbiological Attack of Cellulosic Materials," Biotechnol. & Bioeng. Symp. No. 5, 193-219, (1975); and Millet et al. "Physical and Chemical Pretreatment for Enhancing Cellulose Saccharification," Biotechnol. & Bioeng. Symp. No. 6, 125-153 (1976). Millet et al. discuss various pretreatments of cellulosic materials, particularly woods and straw, to upgrade their digestibility, including swelling with alkaline agents such as sodium hydroxide, primary amines, aqueous or gaseous ammonia and anhydrous ammonia in both liquid and gaseous forms. They also discuss delignification, steaming of wood or straw to upgrade digestibility, as well as various physical treatments such as grinding, milling, irradiation, heating or compression.

Another treatment which involves both chemical and physical aspects is the so-called Masonite process wherein wood chips are saturated with water under pressure at about 300°-500° F. When the pressure is released, the water evaporates rapidly and the wood fibers tend to separate. This is similar to what occurs when the moisture inside a popcorn kernel evaporates violently and the kernel expands greatly. This process requires considerable expensive thermal energy in the form of steam. It has the additional disadvantage that some plant material is inevitably degraded and made less useful by the high temperatures required. Finally, the moisture content of the product is quite high, about 50%. See U.S. Pat. No. 3,707,436, issued Dec. 26, 1972, to J. J. O'Connor for "Exploding of Ammonia Impregnated Wood Chips;" U.S. Pat. No. 4,235,707, issued Nov. 25, 1980, to J. A. Burke, for Method and Apparatus for Treating Solid Municipal Refuse and Other Cellulose Containing Material; and U.S. Pat. No. 4,136,207, issued Jan. 23, 1979 to R. Bender, for "Method of Treating Lignocellulose Materials to Produce Ruminant Feed."

OBJECTS OF THE INVENTION

It is the principal object of the present invention to provide an improved method for increasing the chemical and biological reactivity of cellulose.

Another object is to provide a method of the foregoing character which is cost effective, and readily applicable to a variety of cellulosic materials.

A further object is to provide a method of the foregoing type which provides a product readily adaptable and useful for a variety of purposes such as feedstuffs for ruminant animals, improved raw materials for the production of alcohol, and the like.

Other objects and advantages of the invention will become apparent from the following description of the preferred embodiment.

SUMMARY OF THE INVENTION

Cellulose is treated to increase its chemical and biological reactivity by contacting cellulose or cellulose-containing materials in a pressure vessel with liquid ammonia in the weight ratio of about one to one respectively at ambient or room temperature, and under the vapor pressure of liquid ammonia at said ambient temperature. The mixture is stirred for a period of time sufficient for the ammonia to wet and swell the cellulose or cellulose-containing material. The pressure is then rapidly reduced to atmospheric, allowing the ammonia to boil. Contact of the material with the ammonia is maintained at the boiling point of the ammonia which essentially freezes the cellulose-containing material. When treatment is completed, the treated material is separated from the liquid and gaseous ammonia which is recovered for recycling.

DESCRIPTION OF THE PREFERRED EMBODIMENT

Figure 1:
FIG. 1 is a photograph enlarged 100× of untreated alfalfa ground to 1.0 mm.

The invention comprises treating cellulose-containing materials, such as alfalfa, wheat straw, corn stover, wood fibers, etc., with a volatile chemical agent at ambient or room temperatures under the vapor pressure of the agent, followed by the rapid release of pressure with concomitant explosive rupture of the plant material. One preferred volatile agent is liquid ammonia, which boils at −33.4° C. and has a vapor pressure of 8.46 atm. at 20° C. Liquid ammonia is known to swell and decrystallize pure cellulose. Other volatile cellulose-swelling agents are monomethyl amine. monoethyl amine, other primary and secondary amines, liquid nitrogen dioxide, liquid sulfur dioxide, and the like. Another volatile chemical agent which can be used in the current invention, but is not believed to swell cellulose, is liquid carbon dioxide.

The present invention may be illustrated by the use of liquid ammonia in treating sun-dried alfalfa (7 percent moisture). One pound of sun-dried alfalfa around to pass a 1 mm screen is treated, in a pressure vessel, with one pound or less of liquid ammonia under a pressure of about 165 psig and a temperature of about 25° C. After stirring the alfalfa-ammonia mixture for less than one-half hour, a gate valve on the pressure vessel containing the ammonia is opened and a portion of the ammonia (about 20 percent or so) evaporates rapidly. Reduction to atmospheric pressure within the vessel takes place in several seconds. The pressure release allows the ammonia to "boil" within the alfalfa, thereby puffing, exploding or expanding the structure of the alfalfa. Since ammonia "boils" at about −33.4° C. at atmospheric pressure, this treatment has the additional effect of freezing the alfalfa, thereby disrupting the plant material and further promoting the reactivity and ease of removal from the alfalfa of cell constituents such as protein.

Furthermore, the cellulose decrystallizing or swelling reaction caused by ammonia is favored at reduced temperature so the −33° C. temperature potentially allows the remainder of the ammonia, which was not immediately evaporated, to react even more extensively with the cellulose component of alfalfa to help further increase the chemical and biochemical reactivity of such cellulose. The liquid ammonia treatment further causes a decrease in the total amount of lignin in the alfalfa as measured by standard techniques. Lignin is known to inhibit the chemical and biochemical reactivity of cellulose. Table 1 shows a forage fiber analysis of treated and untreated alfalfa and Table 2 shows the effect of treatment conditions or cellulosic digestibility. Samples 8, 9 and 10 were ammonia-treated under various conditions.

TABLE 1

Forage Fiber Analysis of Ammonia-Treated Alfalfa (Percent of Wet Weight)

| Sample # | Moisture | Cellulose | Ash | Hemicellulose | Lignin | Total Nitrogen |
|---|---|---|---|---|---|---|
| Untreated | 6.4 | 37.5 | 3.1 | 8.7 | 13.7 | 2.05 |
| 8 | 14.7 | 45.2 | 1.8 | 10.1 | 10.6 | 3.4 |
| 9 | 10.2 | 41.9 | 4.9 | 1.0 | 11.1 | 3.75 |

TABLE 1-continued

Forage Fiber Analysis of Ammonia-Treated Alfalfa (Percent of Wet Weight)

| Sample # | Moisture | Cellulose | Ash | Hemicellulose | Lignin | Total Nitrogen |
|---|---|---|---|---|---|---|
| 10 | 6.1 | 41.2 | 2.9 | 3.5 | 10.6 | 2.93 |

TABLE 2

Effect of Treatment Conditions on Cellulose Digestibility

| Sample # | Time of Treatment, Hours | Pressure, psia | Ammonia/Alfalfa Ratio lb/lb | Expelled? | Cellulose Digestibility Mg G/gm Dry Fiber |
|---|---|---|---|---|---|
| 1 | 0.5 | 180 | 1.1 | yes | 418 |
| 2 | 0.5 | 180 | 1.1 | no | 404 |
| 3 | 0.5 | 145 | 1.7 | yes | 328 |
| 4 | 0.5 | 145 | 1.7 | no | 328 |
| 5 | 2.0 | 180 | 5.0 | yes | 361 |
| 6 | 0.1 | 165 | 2.0 | yes | 387 |
| 7 | 0.1 | 165 | 2.0 | no | 400 |
| 8 | 1.0 | 140 | 3.3 | yes | 330 |
| 9 | 1.0 | 140 | 3.3 | no | 338 |
| 10 | 3.0 | 170 | 8.0 | yes | 378 |

As can be seen from the tables, a pressure of about 180 psia, an ammonia to alfalfa weight ratio of one-to-one, and a treatment time of about one half hour or less appears to be sufficient to give a highly digestible cellulose structure, as measured by soluble glucose produced by cellulase enzymes.

After treatment with liquid ammonia, essentially 100 percent of the measured cellulose content of alfalfa can be converted to glucose sugar by hydrolytic cellulose enzymes, as compared to only about 50 percent prior to the treatment. Typical sugar yields for untreated alfalfa are about 220 mg /gram dry fiber. Similar increases in cellulose digestibility are observed for wheat straw. In addition, around 90 percent of the protein can be extracted from the alfalfa using warm (50° C.) alkaline solutions as compared to only about 50 percent prior to the ammonia treatment. Furthermore, the apparent lignin content is reduced from 13 percent to about 10 percent. The digestibility of the alfalfa for ruminant animals is likewise greatly improved, and the metabolizable energy from alfalfa's cellulose content is significantly increased. See Tables 3, 4 and 5.

TABLE 3

Initial Rate and Ultimate Extent of Cellulose Hydrolysis at Two Enzyme Levels

| Sample # | Enzyme Level | 3 hour-Hydrolysis Mg glucose/gm dry fiber | 24 hour-Hydrolysis, Mg glucose/gm dry fiber |
|---|---|---|---|
| 6 | 86 IU/gram fiber | 353 | 387 |
| 6 | 17 IU/gram fiber | 386 | 421 |
| 7 | 86 IU/gram fiber | 331 | 400 |
| 7 | 17 IU/gram fiber | 343 | 406 |

TABLE 4

In Vitro Dry Matter Digestibility of Various Alfalfa Samples Using Rumen Fluid

| Sample | Percent In Vitro Digestibility 24 Hours | 48 Hours |
|---|---|---|
| Untreated Alfalfa Hay | 42 | 45 |
| Ammonia treated - not expelled | 41 | 55 |
| Ammonia treated - | 45 | 59 |

TABLE 4-continued

In Vitro Dry Matter Digestibility of Various
Alfalfa Samples Using Rumen Fluid

| Sample | Percent In Vitro Digestibility | |
|---|---|---|
| | 24 Hours | 48 Hours |
| expelled | | |

TABLE 5

Cellulose Digestibility Under Various Conditions of
Light and Relative Humidity

| Storage Time, Days | Digestibility, milligrams glucose/gram dry fiber, under | | | |
|---|---|---|---|---|
| | Diffuse Light | | Dark | |
| | 47% RH | 100% RH | 47% RH | 100% RH |
| 0 | 308 | — | — | — |
| 1 | 316 | 356 | 329 | 342 |
| 4 | 249 | 352 | 291 | 299 |
| 7 | 337 | 364 | 328 | 385 |
| 14 | 330 | 350 | 365 | 315 |
| 21 | 293 | 279 | 266 | 332 |
| 28 | 269 | 391 | 293 | 316 |

Although the present example is alfalfa, the treatment is applicable to other cellulose-containing plant materials such as wheat straw, corn stover, wood, etc. In addition, although the preferred agent is liquid ammonia, other voltatile cellulose swelling agents, such as mono-methyl and mono-ethylamine, nitrogen dioxide and sulfur dioxide may also be used. In essence, the heat of vaporization of the volatile agent is used to lower the temperature of the ligno-cellulosic material so that more favorable conditions exist for cellulose decrystallization. Furthermore, pressure release helps disrupt the structure of the lignocellulosic material as the volatile agent evaporates, and the freezing which may result, depending on the particular volatile agent chosen, further disrupts the structure of the lignocellulosic material. These factors combine synergistically to produce a more chemically and biochemically reactive cellulose and a plant material from which components such as proteins, sugars, hydrocarbons and so forth can be more readily extracted.

Volatile chemical agents such as liquid carbon dioxide which are not believed to swell cellulose may also be used in this way to rupture plant material with simultaneous freezing. However, some of the beneficial synergism between explosive rupture of the material, cellulose swelling and reduced temperature will likely be lost with such noncellulose-swelling agents.

Figure 2:
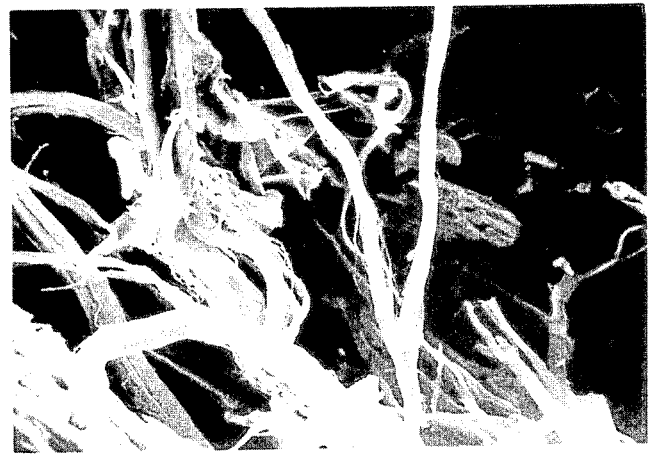
FIG. 2 is a photograph enlarged 100× of alfalfa as shown in FIG. 1, but treated by the method described herein.
Figure 3:
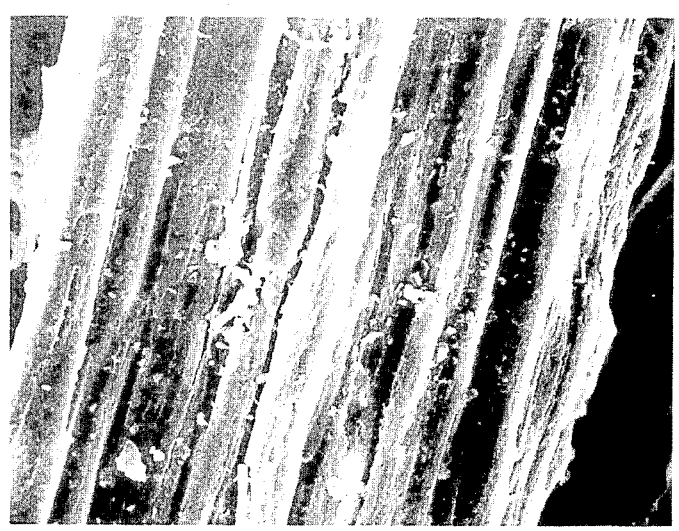
FIG. 3 is a photograph enlarged 400× of untreated alfalfa ground to 1.0 mm.
Figure 4:
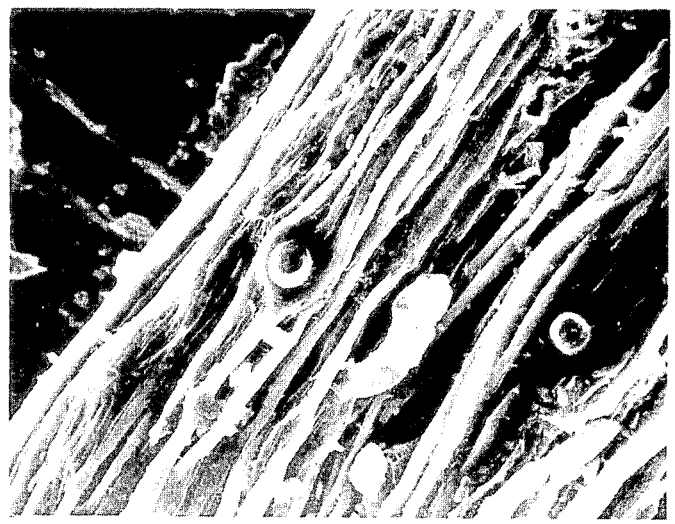
FIG. 4. is a photograph enlarged 400× of alfalfa as shown if FIG. 3, but treated by the method described herein.

FIG. 1 shows untreated alfalfa, ground to pass a 1.0 mm. screen. Following treatment according to the present invention with liquid ammonia, the alfalfa shows an expanded structure with more exposed fibers. The alfalfa seems to split longitudinally along its fiber axis. FIG. 3 shows further untreated alfalfa, while FIG. 4 shows in more detail the longitudinal splits which occur in the fibers as a result of treatment according to the invention. The characteristics of the treated alfalfa are apparent from FIGS. 2 and 4. The treated alfalfa is characterized by a large number of exposed fibers which often assume a thread-like appearance. The swelling and subsequent expansion seems to tear much of the plant tissue to pieces. This helps increase the surface area of the plant fibers for microbial attack and enzymatic or other reactions. This increase in surface area is shown by a 50% increase in the water holding capacity of alfalfa after ammonia treatment.

The moisture content of the alfalfa also seems to contribute to the effectiveness of the process. This may be attributed at least in part to the freezing effect occurring upon the expansion of the ammonia impregnated fibers. See Table 6.

TABLE 6

Enzyme Hydrolysis of Alfalfa Samples Treated under
Various Conditions

| Sample Description | Milligrams Glucose/Gram Dry Fiber After Hydrolysis for: | |
|---|---|---|
| | 3 Hours | 24 Hours |
| (1) Wet alfalfa, 1 lb. "dry" alfalfa plus 0.4 lb $H_2O$ to yield 30% moisture total with 1 lb. liquid $NH_3$ - rapid pressure release | 225 | 463 |
| (2) Alfalfa, dry - with 1 lb liquid $NH_3$ - slow pressure release (5 minutes) allowed to freeze, -33° C. | 163 | 275 |
| (3) Alfalfa, dry - with 1 lb liquid $NH_3$ - slow pressure release (about 1 hour) not allowed to freeze, temperature maintained at about +40° C. | 172 | 310 |
| (4) Alfalfa, dry - treated with ammonia gas at 50 psig - rapid pressure release | 157 | 328 |

The treatment of cellulose-containing materials with volatile swelling agents, preferably liquid anhydrous ammonia, to increase the reactivity of cellulose and the accessibility of the fiber has a number of advantages over the prior art. The treatment is relatively inexpensive. The ammonia-treated material is stable as regards its improved digestibility for long periods of time under practical conditions. The cellulose is left in a highly reactive form which may be more completely converted to monomeric sugars by either acid or enzyme hydrolysis or by microbial action in ruminant animals such as cattle. Since the low digestibility of cellulose in forages such as alfalfa, or in straws such as wheat straw, etc., is the primary limitation in the use of such cellulose-containing materials as energy sources for ruminant animals, such increases in digestibility or reactivity of cellulose are extremely important. The present invention affords a new approach to animal feeding based on inexpensive ligno-cellulosic materials. One particularly attractive possibility involves a separation of alfalfa into its leaf and stem fractions. The leaf fraction contains a high protein content and a low fiber content so that it is especially valuable as a feed for non-ruminant animals such as hogs, poultry, etc. Since the protein is concentrated in the leaf fraction, it is somewhat more valuable than is the initial unseparated alfalfa. The remaining stem fraction, which contains most of the cellulose present in the unseparated material, can be treated with liquid ammonia to greatly increase its cellulose digestibility while leaving behind a significant quantity of ammonia (about 1% or so by weight of the fiber) to serve as a nitrogen source in the rumen. Therefore, ammonia-treated alfalfa stems would be greatly improved both as sources of nitrogen and digestible energy for ruminant animals. Alternatively, the treated stems or other cellulosic materials could be hydrolyzed to soluble sugars which could then be fermented to a variety of products including ethanol, or used in other reactions of importance.

The structure of the material is expanded and disrupted by the rapid pressure release so as to increase the extractability of valuable plant components such as protein and the accessibility of all reactive agents to the fiber, and other plant components. The disruption of the plant material is shown by the decrease in bulk alfalfa density from 0.29 gm/cm$^3$ before treatment to about 0.18 gm/cm$^3$ after the ammonia treatment.

The freezing caused by the evaporation of ammonia further increases the reactivity of the cellulose and increases the extractability of the protein by rupturing many plant cells. Freezing could also increase the general disruption of the plant material by embrittling the material and making it more easily shattered by the rapidly expanding gases. Since no high temperatures are used, degradation products of decreased value are not likely to be formed nor are inhibitors of fermentation likely formed.

Since the ammonia is volatile, it can be readily recovered from the alfalfa by applying only waste heat of essentially zero value. The recompression of ammonia is simple and relatively inexpensive. Also, no third agent such as water need be added to remove the ammonia as is necessar with many of the other chemical agents which increase cellulose reactivity. This prevents cellulose recrystallization caused by the presence of water, which reduces the reactivity of the cellulose. Furthermore, the treated cellulosic material is left dry and in a stable state in which the increased reactivity is maintained over many weeks. Therefore, such treated material could conceivably be shipped or stored for significant periods of time without losing the effect of the treatment. By comparison, cellulosic materials treated by other chemical agents which would have to be removed by washing would probably require drying for transport and storage. This of course further increases the expense and inconvenience of such alternative treatments.

It is not necessary to remove all of the ammonia from the alfalfa since residual ammonia can serve as the nitrogen source required in fermentation to produce, for instance, alcohol fuel or as a nitrogen source for feeding ruminant animals such as cattle. Ammonia is not toxic nor carcinogenic as are many of the chemical treatment agents for cellulose. Liquid ammonia exerts a strong antimicrobial action, which reduces the total microbial load of the treated cellulosic material. This may permit little or no sterilization of cellulosic feeds to fermentation processes, a potential cost savings.

The reduced temperatures which favor and enhance the decrystallizing reaction between the swelling agents and cellulose are produced simply and conveniently in the present invention. All that is necessary to produce the reduced temperatures is to release the pressure on the system, thereby evaporating a portion of the volatile swelling agent and rapidly cooling the cellulosic material to a temperature at which it may react more favorably with the remainder of the swelling agent. The pressure change and the resultant boiling of the liquid swelling agent within the fiber also causes the cellulosic material to increase in volume as does a popcorn kernel when the water within it boils. This method of decreasing the bulk density of ligno-cellulosic materials ("puffing" them) at reduced temperatures is much preferable to the steam explosion or Masonite process which accomplishes an analogous physical expansion of cellulosics at high temperatures that inevitably lead to sugar losses and general degradation of the lignocellulosic material.

The ammonia treatment also appears to actually increase the amount of cellulose measurable in the alfalfa by standard techniques. The removal of lignin and the disruption of the fiber seem to "uncover" cellulose which was not previously measurable. This could further increase the amount of cellulose in the fiber which is available for reaction.

While certain illustrative methods, compositions and embodiments of the present invention are described above, it should be understood that there is no intention to limit the invention to the specific forms thereof disclosed. On the contrary, the intention is to cover all modifications, alternatives, equivalents and uses falling within the spirit and scope of the invention as expressed in the appended claims.

What I claim is:

1. A process for enhancing the cellulose digestibility and protein availability of alfalfa to enhance the alfalfa as a feed for animals, said process comprising applying ammonia to the alfalfa for a time period less than about one hour at a treatment pressure in the range of about 140 psia to about 180 psia and at a treatment temperature of about 25° C., thereby increasing the digestibility of the cellulose in the alfalfa and increasing the availablity of protein from the fibers and from within the cell walls of the the alfalfa to animals.

2. The method of claim 1 wherein said ammonia is liquid or gaseous ammonia.

3. A process as set forth in claim 1, wherein the ammonia is applied in a liquid state to the alfalfa in a ratio in the range of about 1 to 2 parts ammonia to one part alfalfa on a weight basis.

4. The method of treating alfalfa having a water content of up to about 30% by weight of increase the chemical and biological reactivity, comprising mixing alfalfa with liquid ammonia, in the weight ratio of ammonia to alfalfa of about one to one respectively, at a temperature of about 25° C., and under the vapor pressure of liquid ammonia at said temperature, maintaining said alfalfa and ammonia mixture at said mixing temperature and pressure for a period of time sufficient for the ammonia to swell the cellulose of the alfalfa, rapidly reducing the pressure from mixing pressure to atmospheric pressure and allowing the ammonia to boil and thereby to explode and freeze the alfalfa, maintaining said alfalfa and ammonia mixture at the boiling point of the ammonia for a time sufficient to continue freeze treating of the alfalfa to disrupt the cellulose cells of the alfalfa and enhance the reactivity thereof in an animal digestive process, and separating the treated alfalfa from the liquid and gaseous ammonia and recovering the ammonia for recycling.

5. A process for enhancing the cellulose digestibility and protein availibility of alfalfa, said process comprising applying ammonia to the alfalfa for a time period less than about one hour at a treatment pressure in the range of about 140 psia to about 180 psia, and at ambient temperature, explosively reducing the pressure from the treatment pressure to atmospheric pressure, and separating the ammonia from the alfalfa, thereby increasing the digestibility of the cellulose in the alfalfa and increasing the availability of protein from the fibers and from within the cell walls of the alfalfa.

6. A process as set forth in claim 5, wherein the ammonia is applied in a liquid state to the alfalfa in a ratio in the range of about 1 to about 2 parts ammonia to about one part alfalfa on a weight basis.

* * * * *